Dec. 26, 1967  W. N. LARSEN ETAL  3,359,631

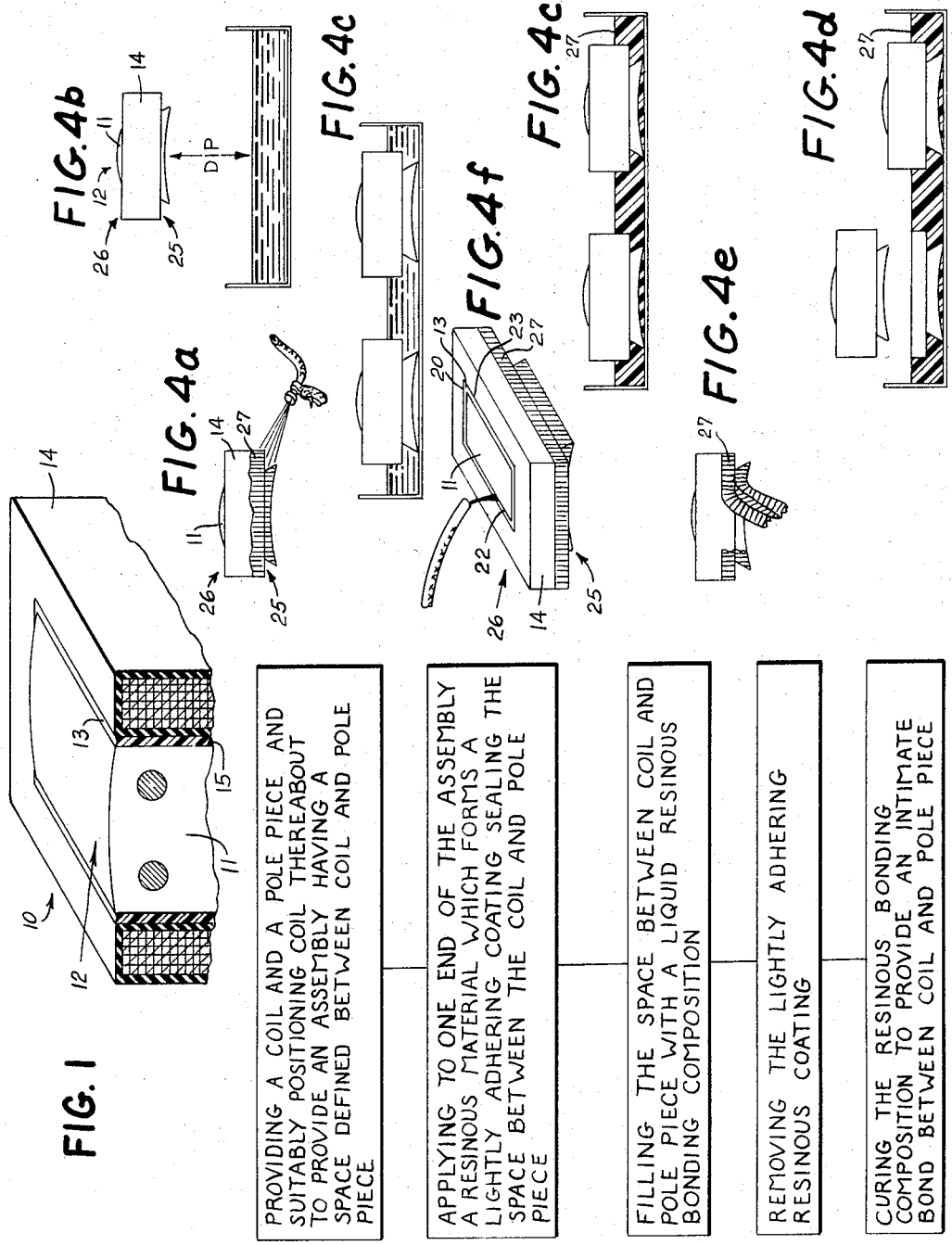

METHOD OF MAKING ELECTRICAL MEMBERS

Filed June 14, 1965  2 Sheets-Sheet 2

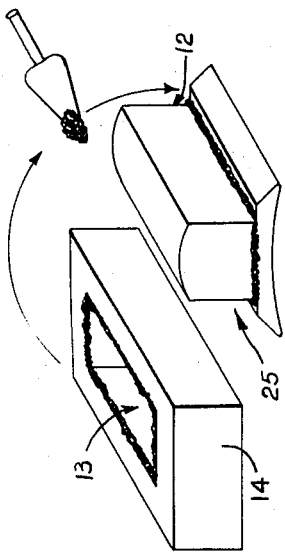

FIG. 5a

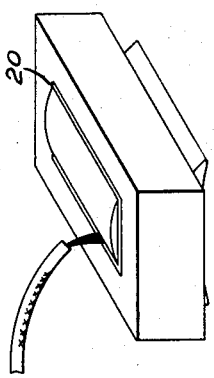

PROVIDING A COIL HAVING A CENTRAL OPENING AND A POLE PIECE THEREFOR

APPLYING A RESINOUS MATERIAL TO THE INSIDE WALLS OF THE COIL OPENING AND/OR THE POLE PIECE AT ONE END THEREOF

POSITIONING THE COIL ABOUT THE POLE PIECE TO PROVIDE AN ASSEMBLY HAVING A SPACE DEFINED BETWEEN THE COIL OPENING AND THE POLE PIECE

APPLYING ADDITIONAL RESINOUS MATERIAL TO THE END OF THE ASSEMBLY AND COVERING THAT END OF THE SPACE BETWEEN THE COIL AND POLE PIECE

AT LEAST PARTIALLY CURING THE RESINOUS MATERIAL PREVIOUSLY APPLIED TO THE END OF THE ASSEMBLY TO PROVIDE A SEAL AT THAT END FOR THE SPACE BETWEEN THE COIL AND POLE PIECE

FILLING THE SPACE BETWEEN THE COIL AND POLE PIECE WITH A LIQUID RESINOUS BONDING COMPOSITION

CURING THE RESINOUS BONDING COMPOSITION TO PROVIDE AN INTIMATE BOND BETWEEN THE COIL AND POLE PIECE

INVENTORS.
WALTER N. LARSEN
ROGER C. PURDY
DAVID G. SCHWENKER
BY
THEIR ATTORNEY

United States Patent Office 3,359,631
Patented Dec. 26, 1967

3,359,631
METHOD OF MAKING ELECTRICAL MEMBERS
Walter N. Larsen, Roger C. Purdy, and David G. Schwenker, Erie, Pa., assignors to General Electric Company, a corporation of New York
Filed June 14, 1965, Ser. No. 463,675
12 Claims. (Cl. 29—606)

ABSTRACT OF THE DISCLOSURE

A method of making a coil-pole piece assembly for a dynamoelectric machine wherein one end of the space between the coil and pole piece is suitably sealed, such as by an at least partially cured resinous composition or a lightly adhering coating, and the space thereafter filled with a liquid resinous bonding composition which when cured provides for an intimate essentially void-free bond between the coil and the pole piece.

---

This invention relates to a new and improved method of making electrical members, especially electrical members for dynamoelectric machines. While this invention has numerous other applications which will become obvious to those skilled in the art, it is especially suited to the making of coil and pole piece assemblies such as those employed in dynamoelectric machines of the salient pole type. Accordingly, the invention will be described in detail herein in connection with the making of such electrical members.

In the electrical industry it is well known that the output ratings of dynamoelectric machines, such as motors and generators, can be increased by increasing the field current to provide greater field strength. This increased field current, however, results in an increase in the heat generated in the coil. In order to maintain acceptable operating temperatures, a large portion of this heat must be transferred to the magnet frame. This is accomplished by transferring such heat through the pole piece on which the coil is mounted.

Since it was recognized that better heat transfer between the coil and the pole piece would be achieved when the coil was intimately bonded to the pole piece, various techniques were employed in an attempt to provide an essentially void-free bond between the coil and the pole piece.

In U.S. Patent No. 3,182,383, which is assigned to the same assignee as the present invention, there is described and claimed a method of making an improved coil and pole piece assembly of the type wherein the coil is bonded to the pole piece to provide a rigid, unitary assembly. In that patent there are described troweling and pressure forcing techniques for bonding the coil to the pole piece with a flowable, solventless resinous material. For example, it was shown that the encapsulated coil could be bonded to the pole piece by troweling the resinous bonding material onto the pole piece, and/or the inside surfaces of the coil, after which the coil would be placed about the pole piece and the bonding material cured to provide the desired rigid, unitary pole and coil assembly. Also, as described in that patent, such bonding could be accomplished by first positioning the coil about the pole piece and thereafter forcing the bonding material, under pressure, into the space between the coil and the pole piece.

The coil and pole piece assemblies constructed in accordance with the method described and claimed in U.S. Patent 3,182,383 have been highly successful and, because of their increased heat transfer capabilities, allow for the use of coils of reduced size for a given machine output. In view of the importance of such coil and pole piece assemblies it is extremely desirable to improve the techniques employed in bonding the coils to the pole pieces, especially from the production manufacturing standpoint.

For example, troweling or forcing the bonding material into the coil assembly tends to be a relatively slow procedure. Moreover, since excess resinous bonding material, resulting from troweling or pressure forcing of the material to fill the space between the coil and the pole piece, must be removed prior to subjecting the assembly to the curing cycle, such techniques have proven to be both time consuming as well as somewhat messy to the employees required to perform these operations. Moreover, it would be highly desirable to be able to employ the readily commercially available and less expensive liquid casting type of resinous materials; the liquid resin tending also to assure a more uniform and void-free bond in a much simpler manner.

It is an object of this invention, therefore, to provide a new and improved method of making coil and pole piece assemblies which overcomes one or more of the prior art difficulties and which lends itself readily to production manufacturing.

It is another object of this invention to provide a new and improved method of making coil and pole piece assemblies which is simple, assures an essentially void-free bond between coil and pole piece and which allows for the use of liquid casting type resinous materials if desired.

Briefly stated, in accordance with one aspect of this invention, an electrically insulated coil having a central opening therethrough is positioned about a suitably dimensioned pole piece to provide an assembly having a space defined thereabout between the coil and the pole piece. A confining barrier is formed about one end of the assembly which is operative to seal that end of such space. A resinous bonding composition is then introduced, from the end of the assembly opposite the resinous confining barrier, to fill the space between the coil and the pole piece. After so filling, the resinous bonding composition is cured to provide an intimate bond between the coil and the pole piece.

A suitable confining barrier may be formed about one end of the coil-pole piece assembly by surrounding such end with a material, such as sand, a suitable liquid or the like, which is completely immiscible with the liquid resinous bonding composition filling the space between the coil and the pole piece and has a higher density. Alternatively, the confining barrier may be formed by applying a suitable resinous material to such end to provide a resinous confining barrier.

The resinous confining barrier may be provided by applying a resinous material which when solidified forms a temporary coating which adheres lightly to the surfaces of the coil and pole piece and may be readily removed, such as by stripping off, when desired. Also, such resinous confining barrier may be provided by a thermosetting resinous material applied at one end of the assembly and covering at least the space thereabout between the coil and pole piece. Sufficient solidification of the material to provide the desired confining barrier may be accomplished with only a partial cure of such material if desired.

The novel features believed characteristic of the invention are set forth with particularity in the appended claims. The invention itself, however, together with further objects and advantages thereof, may best be understood by reference to the following description taken in conjunction with the following drawing in which:

FIG. 1 illustrated a bonded coil-pole piece assembly of the type constructed in accordance with this invention;

FIG. 2 is a flow chart illustrating one embodiment of the invention; and

FIG. 3 is a similar flow chart of another embodiment of the invention.

FIG. 4 (a–f) are diagrammatic sketches associated with the flow chart of FIG. 2.

FIG. 5 (a and 6) are diagrammatic sketches associated with the flow chart of FIG. 3.

In FIG. 1 there is illustrated, in section, a portion of a typical coil and pole piece assembly 10 of the type produced in accordance with the method of this invention. As shown, the pole core portion 1 of a pole piece 12 is positioned within the central opening 13 of a wound, electrically insulated coil 14 and the coil is intimately bonded to the pole piece by the hardened, homogenous, essentially void-free region 15 of resinous material to provide a rigid, unitary assembly. The many advantages of such a coil and pole piece assembly are now well recognized in the art, however, reference may be had to U.S. Patent No. 3,182,383 for any further details which may be desired.

The coil 14 may be of any suitable construction and may be made, for example, in accordance with the method of Patent No. 3,182,383; the coil so provided being thereafter bonded to a suitable pole piece of magnetic material in accordance with the present invention.

The invention may be carried out by first providing a wound, electrically insulated coil and a pole piece therefor and suitably positioning the pole core portion of the pole piece within the central opening of the coil so that a substantially uniform space is provided thereabout defined by the sides of the pole core portion and the inside walls of the coil opening as indicated by the flow chart of FIG. 2 and shown by the diagram associated therewith.

Since the space between the pole core sides and the coil opening is open at both the top and bottom ends, it has heretofore not been possible to employ liquid resinous bonding compositions, such as casting resins for example, to bond the coil to the pole piece without employing a mold. The cost of such molds, however, has been prohibitive since so many sizes and shapes are required to accommodate the many different pole piece-coil assemblies of the various types and sizes of dynamoelectric machines.

In accordance with this invention we provide an inexpensive and very greatly simplified method of bonding coils to their pole pieces which is compatible with mass production requirements and lends itself readily to the use of liquid resinous bonding compositions. To this end, after the coil has been suitably positioned about the pole piece, so that the space between the pole piece and the coil opening is substantially uniform about the assembly, we seal one end of the space 20 by applying a resinuous composition to that end. Thus, a confining barrier of resinous material is formed about one end. Preferably, the space at the pole shoe end of the assembly is the end which is provided with the resinous confining barrier and the space between the coil opening and the pole piece is thereafter filled, from the opposite end with a suitable liquid resinous bonding composition.

In the embodiment of the invention, set forth by the flow chart of FIG. 2 and the diagrams of FIG. 4, the resinous confining barrier may be provided by applying to the pole shoe end 25 of the assembly a resinous composition which forms a temporary coating which adheres lightly to the surface of the coil and the pole piece and can be readily removed when desired. The resinous confining barrier, however, may also be provided if desired as set forth by the flow chart of FIG. 3 and the diagrams of FIG. 5 by applying a pasty resinous composition, preferably a pasty thermosetting resinous bonding composition, to one end of the coil and/or the pole piece either prior to or after the coil and pole piece are assembled together. In the latter embodiment the resinous material is then at least partially cured to provide the confining barrier sealing the space 20.

Referring to the diagrams of FIG. 4 and particularly to diagram (f) thereof, there is shown a wound, electrically insulated coil 14 having a central opening 13 therethrough which is positioned about the pole core portion 11 of a pole piece 12. When suitably centered thereabout, there is established a substantially uniform space 20 defined by the inside walls 22 of the coil opening 13 and the sides 23 of the pole core portion 11; the space 20 being open at both its top and bottom ends 26 and 25 respectively. Suitable wedges (not illustrated) may be inserted if desired to assure that the relative positions of the coil and pole piece are maintained during subsequent handling of the assembly.

The space 20 is then sealed at one end, preferably at the pole shoe end 25, by applying thereto a resinous composition which forms a temporary coating which adheres lightly to the surfaces of the coil and pole piece. After such resinous composition has suitably solidified it provides a resinous confining barrier 27 which operates to seal the space 20 at the end 25.

The resinous material may be applied by brushing, spraying, dipping or in any other suitable manner which will provide the required seal for the space 20. The diagrams (a) and (b) in FIG. 4 illustrate, for example, the application of such material by spraying and dipping respectively. The diagram at (c) in FIG. 4 shows that the resinous confining barrier may be very conveniently provided by placing the end of one or more coil-pole piece assemblies into a container of the resinous material which is in its liquid state and allowing such assemblies to remain therein while the material is caused to solidify. For example, if the resinous material in the container is a thermoplastic composition, such as ethyl cellulose, heat may be applied to cause it to assume its liquid state with the removal of such heat being all that is necessary to cause the material to solidify and form the resinous confining barrier sealing the end of the space 20. It will be evident, of course, that the liquid resinous material in the container should have a depth sufficient to cover the open end of the space 20 so that a proper seal therefor is provided.

We have found, for example, that among the materials which produce satisfactory results in forming the desired resinous confining barrier are cellulose derivatives such as ethyl cellulose, cellulose acetate and the like either with or without a suitable plasticizer; film forming colloids consisting of a resin and a solvent and with or without a plasticizer and wherein the resin may be a copolymer of vinyl chloride and vinyl acetate, an acetal resulting from the reaction of polyvinyl alcohol and butyraldehyde, polymerized methyl methacrylate and the like.

From the foregoing description it will be evident that individual confining barriers are formed at one end of each individual coil-pole piece assembly when the resinous material is applied thereto such as by brushing, spraying, dipping or the like (FIGS. 4(a) and (b)). On the other hand, a somewhat common confining barrier may be provided for a number of coil-pole piece assemblies when the resinous material is applied by placing the assemblies in a container of the liquid material and allowing them to remain therein while the material solidifies (FIGS. 4(c) and (c')).

When the resinous confining barrier has been formed in the foregoing described manner the space 20 between the coil and pole piece is filled, from the end opposite that at which the confining barrier has been formed, with a liquid resinous bonding composition (FIG. 4(f)). Preferably, the space 20 is filled with a liquid casting type of resinous material which is compatible with the outer electrical insulation of the coil, exhibits good heat transfer characteristics and a coefficient of thermal expansion not greatly different from that of the outer coil insulation. We have found that resinous materials which produce satisfactory results are resin polymers, such as for example, epoxy resin polymers of the bisphenol-epichlorohydrin type, polyester resin polymers, and the like.

Some examples of satisfactory epoxy resin compositinons are:

| Composition: | Sold by |
|---|---|
| Scotchcast 251 | Minnesota Mining & Mfg. Co |
| Epoxylite 805 | Epoxylite Corporation. |

It will be understood by those skilled in the art that the foregoing materials are intended as examples only and that various other materials are suitable for use in effecting the desired intimate bond between the coil and the pole piece.

As soon as the resinous bonding composition has gelled, sufficiently so that it will no longer flow out of the space 20, the lightly adhering resinous material forming the confining barrier 27 may be removed. The material may be removed for example by merely lifting the coil-pole piece assemblies from the container of solidified material which readily strips away from such assemblies, as shown by diagram (d) in FIG. 4, or by stripping such material from each individual coil-pole piece assembly if such material had been applied by brushing, spraying, dipping or the like as shown by diagram (e) therein. If desired, the resinous material may be converted again to its liquid condition and reused. For example, if the material employed is a thermoplastic material, such as ethyl cellulose, it may be merely heated until it is melted and coil-pole piece assemblies again either placed into a container thereof or suitably coated therewith and the process continued as previously described.

The resinous bonding composition filling the space 20 is then cured to provide the desired intimate bond between the coil and pole piece. For example, the coil-pole piece assemblies with the resinous confining barriers removed therefrom may be subjected to a suitable elevated temperature curing cycle. The particular time-temperature curing procedure employed depends upon the bonding composition in the space 20 and, since such procedures for the various materials are well known, no attempt will be made to describe them in detail herein.

FIG. 3 is a flow chart which in combination with the diagrams of FIG. 5(a) and (b) illustrate another embodiment of the invention. As shown, after providing a suitable coil and pole piece, an amount of a resinous composition, preferably a thermosetting epoxy resin bonding composition having a paste-like consistency, is applied to the inside walls of the coil opening, and/or the sides of the pole core, at one end thereof and the coil thereafter centered about the pole piece. Wedges (not illustrated) may be inserted to maintain the relative positions of the coil and pole piece during subsequent handling, if desired. Also, instead of, or in addition to in order to assure a more complete application of material all the way around the assembly at the end 25 of the space 20, the resinous composition may be applied about such space from the outside.

The resinous composition applied to the end 25 of the coil-pole piece assembly is then solidified to form a resinous confining barrier sealing the space 20 at that end. The resinous composition may be sufficiently solidified, for example, by effecting at least a partial cure thereof. After the confining barrier is so formed the space 20 is filled with a suitable liquid resinous bonding composition, such as a liquid casting type epoxy resin for example, as described in detail hereinbefore and such composition then cured to provide the intimate bond between the coil and pole piece.

A suitable paste-like resinous composition for application to the end of the coil and/or pole core to provide the resinous confining barrier is described at column 7 of U.S. Patent 3,182,383 and comprises the following constituents:

| | Parts by weight |
|---|---|
| Araldite 6005 (resin) | 100 |
| Boron trifluoride-monoethylamine | 3 |
| Lithium aluminum silicate (200 mesh) | 125 |
| Fumed silica | 4-6 |
| 1/32" milled glass fibers | 7 |
| Polyethylene glycol | 6 |

Araldite is an ethoxyline resin sold by the Ciba Company and lithium aluminum silicate is commercially available from the Foote Mineral Company under the trademark Zerifac.

Another material producing satisfactory results is Scotchcast #214 which is manufactured and sold by the Minnesota Mining and Manufacturing Company.

While only certain preferred features of the invention have been shown by way of illustration, many modifications and changes will occur to those skilled in the art. Thus, for example, while some specific materials found to produce satisfactory results have been given, it is to be understood that such materials are examples only and are not intended as placing any restrictions or limitations on the invention. Accordingly, the appended claims are intended to cover all such modifications and changes as fall within the true spirit and scope of the invention.

What we claim as new and deire to secure by Letters Patent of the United States is:

1. The method of making an electrical member for a dynamoelectric machine which comprises:
   (a) providing a coil having a central opening therethrough and a pole piece therefor having a portion adapted to fit within the coil opening;
   (b) positioning the coil about the pole piece to provide an assembly having a space thereabout defined between the coil opening and the portion of the pole piece disposed therein;
   (c) sealing one end of said space with a resinous material;
   (d) filling said space from the end opposite said seal with a liquid resinous bonding composition; and
   (e) curing the resinous bonding composition to provide an intimate bond between the coil and the pole piece.

2. The method of claim 1 wherein said space is sealed at said one end with a thermoplastic resinous material.

3. The method of claim 2 wherein said thermoplastic material forms a temporary coating which adheres lightly to the surface of said assembly and may be readily stripped therefrom.

4. The method of claim 1 wherein said space is sealed at said one end with a thermosetting composition having a paste-like consistency and which composition is thereafter at least partially cured to effect a positive seal.

5. The method of making an electrical member for a dynamoelectric machine which comprises:
   (a) providing a coil having a central opening therethrough and a pole piece therefor having a core portion adapted to be disposed within said central opening;
   (b) positioning the core portion of said pole piece within said coil opening so that said core portion is substantially centrally located therein and with a space established between the walls of said coil opening and the sides of said core portion;
   (c) applying a resinous material to one end of said assembly forming a temporary coating which adheres lightly and may be readily stripped off, said resinous material providing a seal for that end of the space between the coil and the pole piece;
   (d) filling the space between the coil and the pole piece from the end opposite that on which the protective coating is formed with a liquid resinous bonding composition;
   (e) removing the temporary protective coating;
   (f) and curing the resinous bonding composition.

6. The method of making an electrical member for a dynamoelectric machine which comprises:
   (a) providing a coil having a central opening therethrough and a pole piece therefor having a core portion adapted to be disposed within said central opening;
(b) positioning said coil about the core portion of said pole piece to provide an assembly having a space established thereabout between the coil and the pole piece;
(c) placing one end of said assembly into a container of liquid resinous material to a depth sufficient to cover the open end of said space;
(d) causing said resinous material in said container to solidify with said coil-pole piece assembly therein so that said solidified material forms a resinous confining barrier which seals the open end of said space at that end of the assembly;
(e) filling the space between said coil and pole piece from the open end thereof with a liquid resinous bonding composition;
(f) removing said pole piece assembly from the solidified resinous material; and
(g) curing the resinous bonding composition.

7. The method of claim 6 wherein said one end of said coil-pole piece assembly is placed into a container of a liquid resinous material which when solidified adheres lightly to the surface of said assembly and may be readily stripped therefrom.

8. The method of claim 7 wherein the material in said container is a thermoplastic resinous composition.

9. The method of making an electrical member for a dynamoelectric machine which comprises:
(a) positioning a coil having a central opening therethrough about a pole piece to provide an assembly having a space thereabout defined between the pole piece and the coil opening and which space is open at both ends;
(b) applying a strippable resinous material to one end of said assembly to effect a temporary seal at that end of said space;
(c) filling said space from the end opposite said seal with a liquid resinous bonding composition;
(d) removing said strippable resinous material from the end of said assembly after said liquid resinous bonding composition has at least gelled; and
(e) subjecting said assembly to an elevated temperature for a time sufficient to cure said resinous bonding composition to a hardened mass intimately bonding said coil to said pole piece.

10. The method of making an electrical member for a dynamoelectric machine comprising:
(a) positioning an electrically insulated coil having a central opening therethrough about a pole piece to provide an assembly having a space defined thereabout between the coil and the pole piece;
(b) providing a confining barrier of resinous material at one end of said assembly operative to seal the space between the coil and pole piece at said one end;
(c) filling the space between the coil and pole piece with a liquid resinous bonding composition;
(d) and causing said resinous bonding composition to cure to provide an intimate bond between said coil and said pole piece.

11. The method of making an electrical member for a dynamoelectric machine comprising:
(a) positioning an electrically insulated coil having a central opening therethrough about a pole piece to provide an assembly having a space defined thereabout between said coil opening and said pole piece;
(b) applying a resinous composition to one end region of said assembly covering at least the space between said coil and pole piece at said one end;
(c) causing said resinous material to solidify to provide a confining barrier which seals the space between the coil and pole piece at said one end;
(d) filling the space between said coil and pole piece from the end opposite said confining barrier with a liquid resinous bonding composition;
(e) and curing said resinous bonding composition to provide an intimate bond between said coil and said pole piece.

12. The method of making an electrical member for a dynamoelectric machine which comprises:
(a) positioning a coil having a central opening therethrough about the core of a pole piece to provide an assembly having a space defined thereabout between the coil opening and said core;
(b) surrounding one end of said assembly with a material capable of forming at least a temporary confining barrier thereat operative to seal that end of said space;
(c) filling said space from the end opposite said confining barrier with a liquid resinous bonding composition; and
(d) curing said resinous bonding composition to provide an intimate bond between said coil and said pole piece.

References Cited
UNITED STATES PATENTS

| | | | |
|---|---|---|---|
| 3,237,137 | 2/1966 | Flamino | 29—606 X |
| 3,255,512 | 6/1966 | Lochner et al. | 29—606 X |
| 3,304,599 | 2/1967 | Nordin | 29—606 X |

CHARLIE T. MOON, *Primary Examiner.*

J. CLINE, *Assistant Examiner.*